(12) United States Patent
Yu

(10) Patent No.: US 12,209,017 B2
(45) Date of Patent: Jan. 28, 2025

(54) GREEN LITHIUM IRON PHOSPHATE PRECURSOR, PREPARATION METHOD THEREFOR AND APPLICATION THEREOF

(71) Applicant: SHANGHAI LIANGFU NEW ENERGY TECHNOLOGY CO., LTD., Shanghai (CN)

(72) Inventor: Xiaolin Yu, Shanghai (CN)

(73) Assignee: SHANGHAI LIANGFU NEW ENERGY TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/688,381

(22) PCT Filed: Sep. 9, 2022

(86) PCT No.: PCT/CN2022/118186
§ 371 (c)(1),
(2) Date: Mar. 1, 2024

(87) PCT Pub. No.: WO2023/036308
PCT Pub. Date: Mar. 16, 2023

(65) Prior Publication Data
US 2024/0417259 A1    Dec. 19, 2024

(30) Foreign Application Priority Data
Sep. 10, 2021 (CN) .................. 202111064354.9

(51) Int. Cl.
*C01B 25/45* (2006.01)
*H01M 4/02* (2006.01)
*H01M 4/58* (2010.01)

(52) U.S. Cl.
CPC ............ *C01B 25/45* (2013.01); *H01M 4/5825* (2013.01); *C01P 2002/72* (2013.01);
(Continued)

(58) Field of Classification Search
None
See application file for complete search history.

(56) References Cited

U.S. PATENT DOCUMENTS 9,136,534 B2 *  9/2015  Frianeza-Kullberg .... C01F 1/00
9,672,951 B2 *  6/2017  Hu ........................ H01M 4/625
(Continued)

FOREIGN PATENT DOCUMENTS

CN    102348634 A    2/2012
CN    107814372 A    3/2018
(Continued)

OTHER PUBLICATIONS

Nov. 11, 2022 International Search Report issued in International Patent Application No. PCT/CN2022/118186.
(Continued)

*Primary Examiner* — John J Figueroa
(74) *Attorney, Agent, or Firm* — Houston Beshining Law Office PLLC; Liangang Ye (57) ABSTRACT

Disclosed in the present invention are a novel green lithium iron phosphate precursor, a preparation method therefor and an application thereof. The preparation method comprises the following steps: S1, reacting a mixture of an iron source and a phosphoric acid solution, and grinding after the reaction is completed to obtain a product A; reacting a mixture of an organic acid solution, a lithium source, and a carbon source, and obtaining a product B after the reaction is completed, the preparation order of the product A and the product B being not limited; and S2, grinding the mixture of the product A and the product B to obtain a lithium iron phosphate precursor. In the preparation process of the lithium iron phosphate precursor, the solid content can be
(Continued)

greatly improved, the energy consumption of the subsequent process is low, the preparation method is simple, and the cost is low.

21 Claims, 3 Drawing Sheets

(52) U.S. Cl.
CPC ...... *C01P 2004/03* (2013.01); *C01P 2004/62* (2013.01); *C01P 2006/22* (2013.01); *C01P 2006/40* (2013.01); *H01M 2004/028* (2013.01)

(56) References Cited

U.S. PATENT DOCUMENTS

| | | | |
|---|---|---|---|
| 2006/0147365 A1 | 7/2006 | Okada et al. | |
| 2007/0264567 A1 | 11/2007 | Yang et al. | |
| 2012/0032119 A1 | 2/2012 | Tahara | |
| 2015/0030517 A1* | 1/2015 | Yu | H01M 4/5825 423/306 |
| 2015/0210546 A1* | 7/2015 | Song | B01J 19/24 252/182.1 |

FOREIGN PATENT DOCUMENTS

| | | |
|---|---|---|
| CN | 109607506 A | 4/2019 |
| CN | 109742352 A | 5/2019 |
| CN | 112390241 A | 2/2021 |
| JP | 2007305585 A | 11/2007 |
| WO | 2004036671 A1 | 4/2004 |

OTHER PUBLICATIONS

Nov. 11, 2022 Written Opinion of the International Searching Authority issued in International Patent Application No. PCT/CN2022/118186.

Oct. 28, 2024 the First Office Action issued in Eurasian Patent Application No. 202490695.

Nov. 18, 2024 the First Office Action issued in Korean Patent Application No. 10-2024-7011610.

* cited by examiner

GREEN LITHIUM IRON PHOSPHATE PRECURSOR, PREPARATION METHOD THEREFOR AND APPLICATION THEREOF

The present application is a National Stage of International Application No. PCT/CN2022/118186, filed on Sep. 9, 2022, which claims the priority of Chinese patent application No. 2021110643549, the application date of which is Sep. 10, 2021. This Chinese patent application is incorporated herein by reference in its entirety.

TECHNICAL FIELD

The present disclosure provides a novel green lithium iron phosphate precursor, a preparation method therefor and an application thereof.

BACKGROUND

In recent decades, lithium ion power battery materials have been actively developed globally for use in transportation means, such as electric vehicles and electric bicycles. Research on power batteries used as the vehicle-mounted power has become a major bottleneck in the development of power vehicles. On the basis of cost-effective considerations, lithium ion batteries are more advantageous. Lithium ferrous phosphate ($LiFePO_4$) is also known as lithium iron phosphate. Since the influence factors such as the cyclicity, price, safety, specific energy, $LiFePO_4$ materials have many advantages such as a stable structure, abundant raw material sources, being environmentally friendly and a low cost, and having a theoretical capacity of 170 mAh/g and a stable discharge plateau of 3.5 V; in particular, the safety performance and cycle life thereof are unmatched by other materials, making lithium ferrous phosphate the most attractive positive electrode material today.

The current synthesis methods for $LiFePO_4$ mainly focus on the synthesis processes using iron phosphate as a raw material. A synthesis method using iron phosphate as a raw material generally involves the reaction of iron phosphate with a lithium source and a carbon source, and has the problems that the obtained product has a lower solid content (generally 35% to 40%), and the subsequent process has a higher cost.

In addition, $LiFePO_4$ can also be synthesized by using an iron powder as a raw material through the reaction of the iron powder, phosphoric acid, a lithium source and a carbon source.

For example, WO 2004036671 A1 discloses using metal iron to react with phosphoric acid in an aqueous solution, adding lithium carbonate or lithium hydroxide to prepare a lithium iron phosphate precursor and drying same, subjecting same to a first calcination, and then adding a carbon source and carrying out a secondary calcination to obtain a lithium iron phosphate finished product. However, during the reaction of metal iron powder with phosphoric acid, ferrous phosphate ($Fe_3(PO_4)_2 \cdot 8H_2O$), which is an insoluble divalent iron compound, is mainly generated; this substance makes the solution become a white paste-like high-viscosity substance, which is not conducive to the full reaction of the metal iron powder and the subsequent mixing with a lithium source; furthermore, the solid content of the synthesized product can not be improved, which is not conducive to the productivity improvement and cost saving in the drying process. Although it is mentioned in the document that the reaction of the metal iron powder can be promoted by means of processes of adding hydrochloric acid, oxalic acid, etc., hydrochloric acid induces the oxidation of a product, and oxalic acid tends to generate insoluble ferrous oxalate, which makes it difficult to achieve uniform mixing of raw materials, and in turn makes it difficult to successfully prepare lithium iron phosphate.

As another example, JP 2007305585 A discloses firstly allowing an iron powder to react in an aqueous solution containing phosphoric acid and citric acid, then adding lithium hydroxide to prepare a lithium iron phosphate precursor. However, in this method, the surface of the iron powder reacts with phosphoric acid in the first place to generate ferrous phosphate ($Fe_3(PO_4)_2 \cdot 8H_2O$), which is an insoluble divalent iron compound; the product on the surface layer prevents further reaction of the inner part of the metal iron powder with phosphoric acid, resulting in insufficient reaction and a failure of citric acid to fully exert the chelating effect.

As another example, patent document CN 102348634 A discloses a reaction in an oxidizing atmosphere, wherein the amount of oxygen chemically bonded to an iron powder is controlled, such that a carboxylic acid coexists when the iron powder reacts with phosphoric acid, and the reaction of iron powder with phosphoric acid is promoted through the chelation by mean of the carboxylic acid, which reduces the residue of unreacted iron powder. However, the control of the amount of the bonding between iron powder and oxygen in this solution is relatively complicated.

Therefore, there are problems in the prior art that in the preparation of lithium iron phosphate with iron phosphate as a raw material, the process cost is relatively high due to the lower solid content; and in the preparation of lithium iron phosphate with an iron powder as a raw material, it is difficult to control the solid content to not only enable the reaction to be carried out smoothly, but also allow the low energy consumption in the subsequent process.

CONTENT OF THE PRESENT INVENTION

The present disclosure provides a novel green lithium iron phosphate precursor, a preparation method therefor and an application thereof so as to solve the defects in the prior art that in the preparation of lithium iron phosphate with iron phosphate as a raw material, the process cost is relatively high due to the lower solid content; and in the preparation of lithium iron phosphate with an iron powder as a raw material, it is difficult to control the solid content to not only enable the reaction to be carried out smoothly, but also allow the low energy consumption in the subsequent process.

The inventor has found that in the preparation method for lithium iron phosphate in the prior art, wherein an iron source is used as a raw material, in order for smoothly carrying out the reaction, a too low solid content inevitably occurs, which brings about the defect of great energy consumption in the subsequent process; and if the solid content is increased, the viscosity will be too high to stir. The inventor has unexpectedly found that by firstly preparing a product A from a full reaction of an iron source and phosphoric acid, and a product B from a full reaction of an organic acid, a lithium source and a carbon source, and then mixing and reacting the two, it is possible to enable the solid content in the lithium iron phosphate precursor to reach 50% or more or even 60%, thereby greatly reducing the energy consumption in the preparation of lithium iron phosphate from the lithium iron phosphate precursor, and the preparation method is simple and has a low cost. Furthermore, the method of the present disclosure can prepare a lithium iron phosphate precursor having a very small particle size and a high charge and discharge rate. It is proved through experiments that this effect cannot be achieved if no organic acid is added in the reaction for the product B.

The present disclosure solves the above-mentioned technical problem by means of the following technical solutions.

The present disclosure provides a preparation method for a lithium iron phosphate precursor, the method comprising the following steps:

S1. reacting a mixture of an iron source and a phosphoric acid solution, and grinding after the reaction is completed to obtain a product A, and reacting a mixture of an organic acid solution, a lithium source and a carbon source, and obtaining a product B after the reaction is completed, wherein the preparation order of the product A and the product B is not limited;

S2. grinding a mixture of the product A and the product B to obtain a lithium iron phosphate precursor.

In the present disclosure, in step S1, it is known to a person skilled in the art that the completion state of the mixing and reacting of an iron source and a phosphoric acid solution is generally characterized by no gas being generated from the reaction.

In S1, the iron source is known to a person skilled in the art; the present disclosure is a process method comprising a step of preparing iron phosphate and then preparing lithium iron phosphate; therefore, it is known to a person skilled in the art that the iron source here does not comprise iron phosphate. Preferably, the iron source is a compound containing an iron element and an oxygen element, and is more preferably one or more of an iron powder, ferric oxide, ferriferrous oxide and ferric nitrate, and further more preferably one or more of an iron powder, ferric oxide and ferriferrous oxide.

Herein, preferably, the iron powder has an iron content of 95 wt % or more, more preferably 99 wt % or more, further more preferably 99.5 wt % or more, for example, 99.7 wt %, and can be, for example, one or more of a primary reduced iron powder, a secondary reduced iron powder, a carbonyl reduced iron powder and an electrolytic iron powder.

Herein, preferably, the ferric oxide has a purity of 95 wt % or more, more preferably 99 wt % or more, and further more preferably 99.5 wt % or more.

Herein, preferably, the ferriferrous oxide has a purity of 95 wt % or more, more preferably 99 wt % or more, and further more preferably 99.5 wt % or more.

In S1, preferably, the iron source has a mesh number of 200 to 1000 mesh, more preferably 200 to 500 mesh, for example, 250 mesh or 300 mesh.

In S1, the phosphoric acid solution generally refers to an aqueous phosphoric acid solution, and the mass percentage concentration of phosphoric acid in the phosphoric acid solution is preferably 20% to 85%, for example, 49%, 59% or 62%.

In S1, the phosphoric acid in the phosphoric acid solution can be a conventional phosphoric acid in the art, for example, a technical grade phosphoric acid, a food grade phosphoric acid, an electric grade phosphoric acid or an electronic grade phosphoric acid, wherein the electric grade phosphoric acid can be purchased from GUANGXI QINZHOU CHENGXING CHEMICAL TECHNOLOGY CO., LTD.

In S1, preferably, a reaction temperature for the mixture of an iron source and a phosphoric acid solution is 20 to 95° C., more preferably 30 to 90° C., for example, 35° C., 45° C. or 55° C.

In S1, preferably, the mixture of an iron source and a phosphoric acid solution is prepared by adding the iron source to the phosphoric acid solution in a stirred state.

In S1, preferably, in the mixture of an iron source and a phosphoric acid solution, a molar ratio of the iron element to the phosphoric acid is (0.94-1.05):1, more preferably (0.96-1.0):1, for example, 0.98:1.

In S1, the operations and conditions of the grinding can be conventional grinding operations, and can be sand milling or ball milling.

Herein, preferably, the grinding is performed by means of a sand mill. The sand mill is preferably a vertical sand mill, a horizontal sand mill (for example, a nanoscale horizontal sand mill), a basket sand mill or a double-cone rod sand mill. The grinding beads used in the sand mill preferably have a particle size of 0.1 to 3.0 mm, for example, 0.3 mm or 0.4 mm. The grinding beads used in the sand mill are preferably zirconium oxide beads.

In S1, preferably, the product A has a viscosity of 8,000 to 20,000 cps, more preferably 10,000 to 20,000 cps, for example, 15,000 cps.

In S1, preferably, the mass percentage concentration of an organic acid in the organic acid solution is preferably 5% to 98%, for example, 55%, 62% or 72%.

In S1, preferably, the organic acid in the organic acid solution is a carboxylic acid compound and/or ascorbic acid, the carboxylic acid compound is preferably one or more of formic acid, acetic acid, oxalic acid, citric acid, tartaric acid and malic acid; the organic acid is, for example, citric acid and/or oxalic acid, or malic acid and/or tartaric acid.

In S1, preferably, the lithium source is one or more of lithium hydroxide monohydrate, lithium carbonate, lithium dihydrogen phosphate, lithium phosphate and lithium acetate, more preferably lithium hydroxide monohydrate and/or lithium acetate; the lithium carbonate is preferably a technical grade lithium carbonate or a battery grade lithium carbonate.

In S1, preferably, the molar ratio of lithium element in the lithium source to phosphoric acid in the phosphoric acid solution is 0.98 to 1.05, for example, 1.02, 1.03 or 1.04.

In S1, preferably, the carbon source comprises one or more of glucose, sucrose, starch, phenolic resin, cyclodextrin, polyethylene, polyethylene glycol and polyvinyl alcohol, and more preferably is a mixture of polyvinyl alcohol, cyclodextrin and polyethylene glycol.

In S1, preferably, the addition amount of the carbon source is 1% to 60%, more preferably 5% to 50%, further more preferably 10% to 40% by mass of the iron source.

In S1, preferably, a reaction temperature for the mixture of an organic acid, a lithium source and a carbon source is 20 to 95° C., more preferably 30 to 90° C., for example, 35° C., 40° C. or 45° C.

In S1, preferably, the mixture of an organic acid, a lithium source and a carbon source is prepared by adding the lithium source and the carbon source to an organic acid solution in a stirred state.

In S2, the mixture of the product A and the product B can be generally obtained by mixing the product A and the product B.

In S2, the operations and conditions of the grinding can be those conventional in the art. A preferred embodiment of the grinding can be the same as that in S1.

In S2, preferably, the lithium iron phosphate precursor has a particle size of 170 to 250 nm, for example, 200 nm or 220 nm.

The present disclosure further provides a lithium iron phosphate precursor, which is prepared by the above-mentioned preparation method for a lithium iron phosphate precursor.

In the present disclosure, preferably, the lithium iron phosphate precursor has a particle size of 170 to 250 nm.

The present disclosure further provides a preparation method for lithium iron phosphate, the method comprising the following step:

subjecting the above-mentioned lithium iron phosphate precursor to spray drying, calcinating and crushing.

Herein, the operations and conditions of the spray drying, the calcinating and the crushing can be those conventional in the art.

Herein, during the spray drying, the temperature at a gas inlet can be 280° C.

Herein, during the spray drying, the temperature at an outlet can be 110° C.

Herein, the conditions of the calcinating can be: in a nitrogen atmosphere with a purity of 99.999%, gradually raising the temperature from room temperature to 650° C. at a heating rate of 5° C./min, maintaining the temperature at 650° C. for 10 h, and cooling to obtain a sintered product.

Herein, the conditions of the crushing can be: treating the sintered product by means of a gas-flow crushing device to obtain a target finished product of a positive electrode lithium iron phosphate material with a particle size D50=1.5-3 μm.

The present disclosure further provides a lithium iron phosphate, which is prepared by the above-mentioned preparation method for a lithium iron phosphate.

The present disclosure further provides the use of the above-mentioned lithium iron phosphate in the preparation of a positive electrode material for a lithium ion battery.

On the basis of conforming to common knowledge in the art, the above-mentioned preferred conditions can be arbitrarily combined to obtain various preferred embodiments of the present disclosure.

Reagents and raw materials used in the present disclosure are all commercially available.

The positive effects of the present disclosure lie in:
during the preparation of a lithium iron phosphate precursor of the present disclosure, the solid content can be greatly improved, the energy consumption of the subsequent process is low, and the preparation method is simple and green and environmentally friendly, there is no emission of three wastes and the cost is low, thereby achieving the low-cost production of a lithium iron phosphate positive electrode material with an iron source as a raw material. In addition, the lithium iron phosphate precursor prepared by the present disclosure has an extremely small particle size, and a high charge and discharge rate.

DETAILED DESCRIPTION OF THE PREFERRED EMBODIMENT

The present disclosure is further described below by way of examples; however, the present disclosure is not limited to the scope of the described examples. For the experimental methods in which no specific conditions are specified in the following examples, selections are made according to conventional methods and conditions or according to the product instructions.

Example 1

1. According to a molar ratio of iron element to phosphorus element of 0.96:1, 6.895 kg of a 85% technical grade phosphoric acid was added to 5 L of deionized water and was stirred for diluting same to a concentration of 49%, 3.25 kg of a 200 mesh secondary reduced iron powder with a purity of 99% was slowly added under stirring and was allowed to react at 45° C.; during the reaction, some gas was generated, and the color of the reactant gradually changed from gray-black to gray-white. When no gas was generated in the reaction, the material was fed into a sand mill for sand milling; the grinding beads in the sand mill were 0.3 mm zirconium oxide beads; during the sand milling, the viscosity of the material gradually increased to 15,000 cps, the color thereof gradually changed to pure white, whereby a product A was obtained.

2. According to a molar ratio of lithium element to phosphorus element of 1.04:1, 4 kg of citric acid was dissolved in 3.25 kg of deionized water to prepare a solution, 2.3 kg of a battery grade lithium carbonate and 1 kg of sucrose were gradually added to the solution under stirring and were allowed to react under 40° C., during which a large amount of gas was generated, the reaction is completed when no gas was generated to form a transparent solution, whereby a product B was obtained.

3. The product B was added to the product A; after mixing and stirring, the viscosity of the system rapidly decreased to 1,000 cps, then the system was subjected to sand milling. When the material was ground to a particle size of D50 of about 200 nm, the reaction was completed to obtain a slurry with a solid content of 50%.

4. The reaction product slurry was subjected to spray drying, sintering and crushing to obtain a lithium iron phosphate positive electrode material.

Herein, the conditions of the spray drying were: the temperature at a gas inlet being 280° C., and the temperature at an outlet being 110° C. The conditions of the calcinating were: in a nitrogen atmosphere with a purity of 99.999%, gradually raising the temperature from room temperature to 650° C. at a heating rate of 5° C./min, maintaining the temperature at 650° C. for 10 h, and cooling to obtain a sintered product. The conditions of the crushing were: treating the sintered product by means of a gas-flow crushing device to obtain a target finished product of a positive electrode lithium iron phosphate material with a particle size D50=1.5-3 m.

PXRD (powder X-Ray diffraction) and scanning electron microscope SEM tests were performed on the lithium iron phosphate positive electrode material prepared in example 1.

Figure 1:
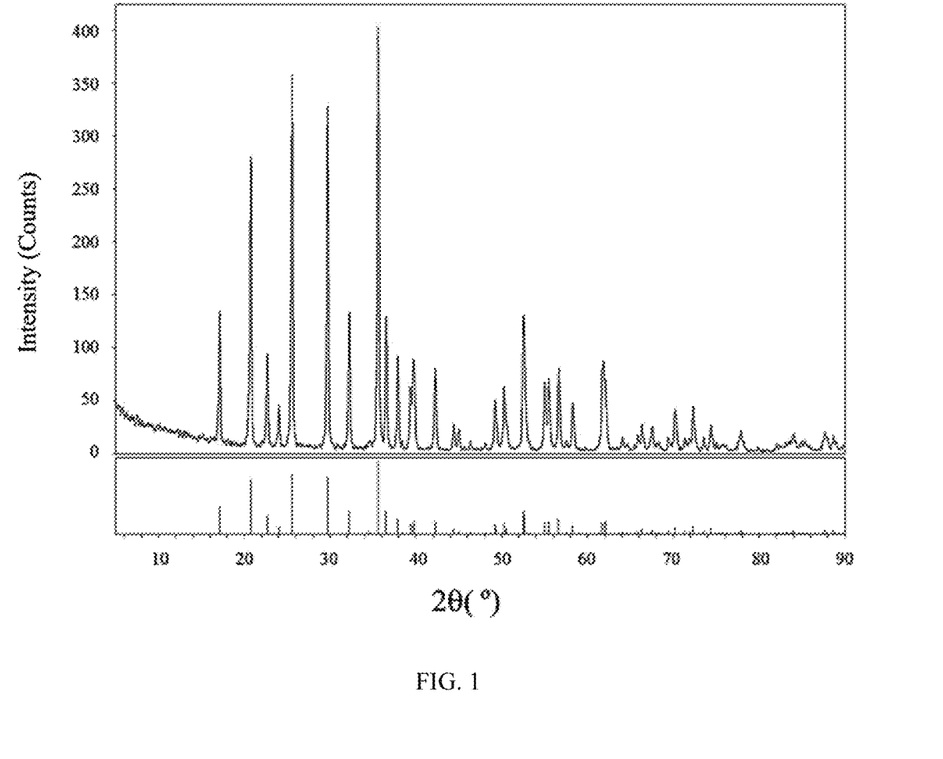
FIG. 1 is an XRD spectrum of the lithium iron phosphate of example 1.
Figure 2:
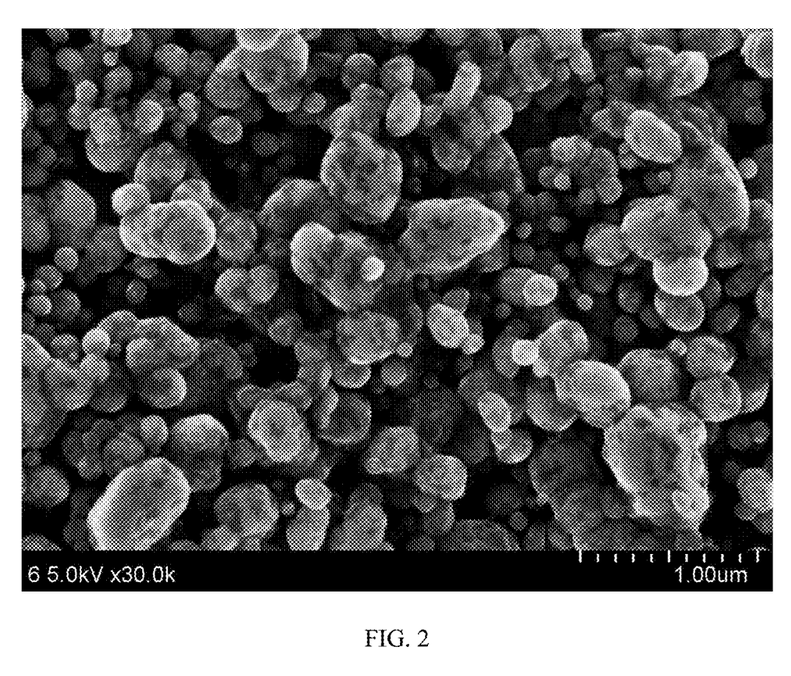
FIG. 2 is a scanning electron microscope photograph of the lithium iron phosphate of example 1.

The PXRD data in FIG. 1 was obtained by a test by means of Bruker D8 ADVANCE (BRUKER). The SEM photograph of FIG. 2 was obtained by a test by means of SU8010 (HITACHI, Ltd).

Example 2

1. According to a molar ratio of iron element to phosphorus element of 0.98:1, 13.8 kg of a 85% food grade phosphoric acid was added to 5 L of deionized water and was stirred for diluting same to a concentration of 62.4%, 6.6 kg of a 250 mesh secondary reduced iron powder with a purity of 99.5% was slowly added under stirring and was allowed to react at 35° C.; during the reaction, some gas was generated, and the color of the reactant gradually changed from gray-black to gray-white. When no gas was generated in the reaction, the material was fed into a sand mill for sand milling; the grinding beads in the sand mill were 0.4 mm zirconium oxide beads; during the sand milling, the viscosity of the material gradually increased to 20,000 cps, the color thereof gradually changed to pure white, whereby a product A was obtained.

2. According to a molar ratio of lithium element to phosphorus element of 1.03:1, 4 kg of citric acid and 4 kg of oxalic acid were dissolved in 5 kg of deionized water to prepare a solution, 2 kg of glucose and 5.18 kg of a technical grade lithium hydroxide monohydrate were gradually added to the solution under stirring and were allowed to react under 35° C., during which a large amount of gas was generated, the reaction is completed when no gas was generated to form a transparent viscous solution, whereby a product B was obtained.

3. The product B was added to the product A; after mixing and stirring, the viscosity of the system rapidly decreased to 1,200 cps, then the system was subjected to sand milling. When the material was ground to a particle size of D50 of about 220 nm, the reaction was completed to obtain a slurry with a solid content of 53%.

4. The reaction product slurry was subjected to spray drying, sintering and crushing to obtain a lithium iron phosphate positive electrode material.

Herein, the conditions of the spray drying were: the temperature at a gas inlet being 280° C., and the temperature at an outlet being 110° C. The conditions of the calcinating were: in a nitrogen atmosphere with a purity of 99.999%, gradually raising the temperature from room temperature to 650° C. at a heating rate of 5° C./min, maintaining the temperature at 650° C. for 10 h, and cooling to obtain a sintered product. The conditions of the crushing were: treating the sintered product by means of a gas-flow crushing device to obtain a target finished product of a positive electrode lithium iron phosphate material with a particle size D50=1.5 to 3 m.

Example 3

1. According to a molar ratio of iron element to phosphorus element of 1:1, 27.6 kg of a 85% food grade phosphoric acid was added to 12 L of deionized water and was stirred for diluting same to a concentration of 59.2%, 13.5 kg of a 300 mesh electrolytic iron powder with a purity of 99.7% was slowly added under stirring and was allowed to react at 55° C.; during the reaction, some gas was generated, and the color of the reactant gradually changed from gray-black to gray-white. When no gas was generated in the reaction, the material was fed into a ball mill for ball milling; during the ball milling, the viscosity of the material gradually increased to 10,000 cps, the color thereof gradually changed to pure white; whereby a product A was obtained.

2. According to a molar ratio of lithium element to phosphorus element of 1.02:1, 6 kg of malic acid and 7 kg of tartaric acid were dissolved in 5 kg of deionized water to prepare a solution, 4 kg of polyethylene glycol and 9.03 kg of a technical grade lithium carbonate were gradually added to the solution under stirring and were allowed to react under 45° C., during which a large amount of gas was generated, the reaction is completed when no gas was generated to form a transparent viscous solution, whereby a product B was obtained.

3. The product B was added to the product A; after mixing and stirring, the viscosity of the system rapidly decreased, then the system was subjected to sand milling. When the material was ground to a particle size of D50 of about 170 nm, the reaction was completed to obtain a slurry with a solid content of 60%.

4. The reaction product slurry was subjected to spray drying, sintering and crushing to obtain a lithium iron phosphate positive electrode material.

Herein, the conditions of the spray drying were: the temperature at a gas inlet being 280° C., and the temperature at an outlet being 110° C. The conditions of the calcinating were: in a nitrogen atmosphere with a purity of 99.999%, gradually raising the temperature from room temperature to 650° C. at a heating rate of 5° C./min, maintaining the temperature at 650° C. for 10 h, and cooling to obtain a sintered product. The conditions of the crushing were: treating the sintered product by means of a gas-flow crushing device to obtain a target finished product of a positive electrode lithium iron phosphate material with a particle size D50=1.5 to 3 m.

Example 4

1. According to a molar ratio of iron element to phosphorus element of 0.98:1, 13.8 kg of a 85% food grade phosphoric acid was added to 5 L of deionized water and was stirred for diluting same to a concentration of 62.4%, 9.11 kg of a 250 mesh ferriferrous oxide with a purity of 99.5% was slowly added under stirring and was allowed to react at 35° C.; during the reaction, some gas was generated, and the color of the reactant gradually changed from gray-black to gray-white. When no gas was generated in the reaction, the material was fed into a sand mill for sand milling; the grinding beads in the sand mill were 0.4 mm zirconium oxide beads; during the sand milling, the viscosity of the material gradually increased to 20,000 cps, the color thereof gradually changed to pure white, whereby a product A was obtained.

2. According to a molar ratio of lithium element to phosphorus element of 1.03:1, 4 kg of citric acid and 4 kg of oxalic acid were dissolved in 5 kg of deionized water to prepare a solution, a mixture of 2 kg of glucose, 3 kg of a technical grade lithium hydroxide monohydrate and 3.43 kg of lithium acetate was gradually added to the solution under stirring and allowed to react under 35° C., during which a large amount of gas was generated, the reaction is completed when no gas was generated to form a transparent viscous solution, whereby a product B was obtained.

3. The product B was added to the product A; after mixing and stirring, the viscosity of the system rapidly decreased to 1,200 cps, then the system was subjected to sand milling. When the material was ground to a particle size of D50 of about 220 nm, the reaction was completed to obtain a slurry with a solid content of 53%.

4. The reaction product slurry was subjected to spray drying, sintering and crushing to obtain a lithium iron phosphate positive electrode material.

Herein, the conditions of the spray drying were: the temperature at a gas inlet being 280° C., and the temperature at an outlet being 110° C. The conditions of the calcinating were: in a nitrogen atmosphere with a purity of 99.999%, gradually raising the temperature from room temperature to 650° C. at a heating rate of 5° C./min, maintaining the temperature at 650° C. for 10 h, and cooling to obtain a sintered product. The conditions of the crushing were: treating the sintered product by means of a gas-flow crushing device to obtain a target finished product of a positive electrode lithium iron phosphate material with a particle size D50=1.5 to 3 μm.

Example 5

1. According to a molar ratio of iron element to phosphorus element of 0.98:1, 13.8 kg of a 85% food grade phosphoric acid was added to 5 L of deionized water and was stirred for diluting same to a concentration of 62.4%, a mixture of 2.2 kg of a 250 mesh secondary reduced iron powder with a purity of 99.5%, 3.03 kg of ferriferrous oxide and 3.14 kg of ferric oxide was slowly added under stirring and was allowed to react at 35° C.; during the reaction, some gas was generated, and the color of the reactant gradually changed from gray-black to gray-white. When no gas was generated in the reaction, the material was fed into a sand mill for sand milling; the grinding beads in the sand mill were 0.4 mm zirconium oxide beads; during the sand milling, the viscosity of the material gradually increased to 20,000 cps, the color thereof gradually changed to pure white, whereby a product A was obtained.

2. According to a molar ratio of lithium element to phosphorus element of 1.03:1, 4 kg of citric acid and 4 kg of oxalic acid were dissolved in 5 kg of deionized water to prepare a solution, 2 kg of a mixture of polyvinyl alcohol, cyclodextrin and polyethylene glycol and 5.18 kg of a technical grade lithium hydroxide monohydrate were gradually added to the solution under stirring and were allowed to react under 35° C., during which a large amount of gas was generated, the reaction is completed when no gas was generated to form a transparent viscous solution, whereby a product B was obtained.

3. The product B was added to the product A; after mixing and stirring, the viscosity of the system rapidly decreased to 1,200 cps, then the system was subjected to sand milling. When the material was ground to a particle size of D50 of about 220 nm, the reaction was completed to obtain a slurry with a solid content of 50%.

4. The reaction product slurry was subjected to spray drying, sintering and crushing to obtain a lithium iron phosphate positive electrode material.

Herein, the conditions of the spray drying were: the temperature at a gas inlet being 280° C., and the temperature at an outlet being 110° C. The conditions of the calcinating were: in a nitrogen atmosphere with a purity of 99.999%, gradually raising the temperature from room temperature to 650° C. at a heating rate of 5° C./min, maintaining the temperature at 650° C. for 10 h, and cooling to obtain a sintered product. The conditions of the crushing were: treating the sintered product by means of a gas-flow crushing device to obtain a target finished product of a positive electrode lithium iron phosphate material with a particle size D50=1.5 to 3 m.

Comparative Example 1

1. According to a molar ratio of iron element to phosphorus element of 0.96:1, 6.895 kg of a 85% technical grade phosphoric acid was added to 5 L of deionized water and was stirred for diluting same to a concentration of 49%, 3.25 kg of a 200 mesh secondary reduced iron powder with a purity of 99% was slowly added under stirring and was allowed to react at 45° C.; during the reaction, some gas was generated, and the color of the reactant gradually changed from gray-black to gray-white. When no gas was generated in the reaction, the material was fed into a sand mill for sand milling; the grinding beads in the sand mill were 0.3 mm zirconium oxide beads; during the sand milling, the viscosity of the material gradually increased to 15,000 cps, the color thereof gradually changed to pure white, whereby a product A was obtained.

2. According to a molar ratio of lithium element to phosphorus element of 1.04:1, 2.3 kg of a battery grade lithium carbonate and 1 kg of sucrose were gradually added to 3.25 kg of deionized water at 40° C. under stirring to prepare a slurry (the lithium carbonate has a low solubility in water), whereby a product B was obtained.

3. The product B was added to the product A; after mixing and stirring, the viscosity of the system rapidly increased, and the slurry solidified, making the sand milling procedure impossible.

Comparative Example 2

1. According to a molar ratio of iron element to phosphorus element of 0.96:1, 6.895 kg of a 85% technical grade phosphoric acid was added to 5 L of deionized water and was stirred for diluting same to a concentration of 49%, 3.25 kg of a 200 mesh secondary reduced iron powder with a purity of 99% was slowly added under stirring and was allowed to react at 45° C.; during the reaction, some gas was generated, and the color of the reactant gradually changed from gray-black to gray-white. When no gas was generated in the reaction, the material was fed into a sand mill for sand milling; the grinding beads in the sand mill were 0.3 mm zirconium oxide beads; during the sand milling, the viscosity of the material gradually increased to 15,000 cps, the color thereof gradually changed to pure white, whereby a product A was obtained.

2. In order to avoid solidification problems when mixing with the product B, 25 kg of deionized water was added to the product A for dilution.

3. According to a molar ratio of lithium element to phosphorus element of 1.04:1, 2.3 kg of a battery grade lithium carbonate and 1 kg of sucrose were gradually added to 3.25 kg of deionized water at 40° C. under stirring to prepare a slurry (the lithium carbonate has a low solubility in water), whereby a product B was obtained.

4. The product B was added to the product A; after mixing and stirring, the system showed no solidification problem, then the system was subjected to sand milling. When the primary particle size of the material was eventually at a D50 of about 800 nm, the system was stable; continuing sand milling, the primary particle size of the particles did not show a tendency to decrease. The reaction was stopped, and a slurry with a solid content of 17% was obtain upon the completion of the reaction.

5. The reaction product slurry was subjected to spray drying, sintering and crushing to obtain a lithium iron phosphate positive electrode material.

Herein, the conditions of the spray drying were: the temperature at a gas inlet being 280° C., and the temperature at an outlet being 110° C. The conditions of the calcinating were: in a nitrogen atmosphere with a purity of 99.999%, gradually raising the temperature from room temperature to 650° C. at a heating rate of 5° C./min, maintaining the temperature at 650° C. for 10 h, and cooling to obtain a sintered product. The conditions of the crushing were: treating the sintered product by means of a gas-flow crushing device to obtain a target finished product of a positive electrode lithium iron phosphate material with a particle size D50=1.5 to 3 km.

Comparative Example 3

1. According to a molar ratio of iron element to phosphorus element of 0.96:1, 6.895 kg of a 85% technical grade phosphoric acid was added to 5 L of deionized water and was stirred for diluting same to a concentration of 49%, 3.25 kg of a 200 mesh secondary reduced iron powder with a purity of 99% was slowly added and then 4 kg of citric acid was added under stirring and were allowed to react at 45° C.; during the reaction, some gas was generated, and the color of the reactant gradually changed from gray-black to yellow green. When no gas was generated in the reaction, the material was fed into a sand mill for sand milling; the grinding beads in the sand mill were 0.3 mm zirconium oxide beads; during the sand milling, the viscosity of the material gradually increased to 15,000 cps, the color thereof gradually changed to yellow green, whereby a product A was obtained.

2. According to a molar ratio of lithium element to phosphorus element of 1.04:1, 2.3 kg of a battery grade lithium carbonate and 1 kg of sucrose were gradually added to 3.25 kg of deionized water at 40° C. under stirring to prepare a slurry (the lithium carbonate has a low solubility in water), whereby a product B was obtained.

3. The product B was added to the product A; after mixing and stirring, the viscosity of the system gradually increased to 20,000 cps or more; in order to ensure the smooth progress of the process, it was necessary to additionally add 10 L of deionized water to reduce the viscosity to 1,200 cps; when the material was ground to a particle size of D50 of about 500 nm, the reaction was completed to obtain a slurry with a solid content of 35%.

4. The reaction product slurry was subjected to spray drying, sintering and crushing to obtain a lithium iron phosphate positive electrode material.

Herein, the conditions of the spray drying were: the temperature at a gas inlet being 280° C., and the temperature at an outlet being 110° C. The conditions of the calcinating were: in a nitrogen atmosphere with a purity of 99.999%, gradually raising the temperature from room temperature to 650° C. at a heating rate of 5° C./min, maintaining the temperature at 650° C. for 10 h, and cooling to obtain a sintered product. The conditions of the crushing were: treating the sintered product by means of a gas-flow crushing device to obtain a target finished product of a positive electrode lithium iron phosphate material with a particle size D50=1.5 to 3 km.

Figure 3:
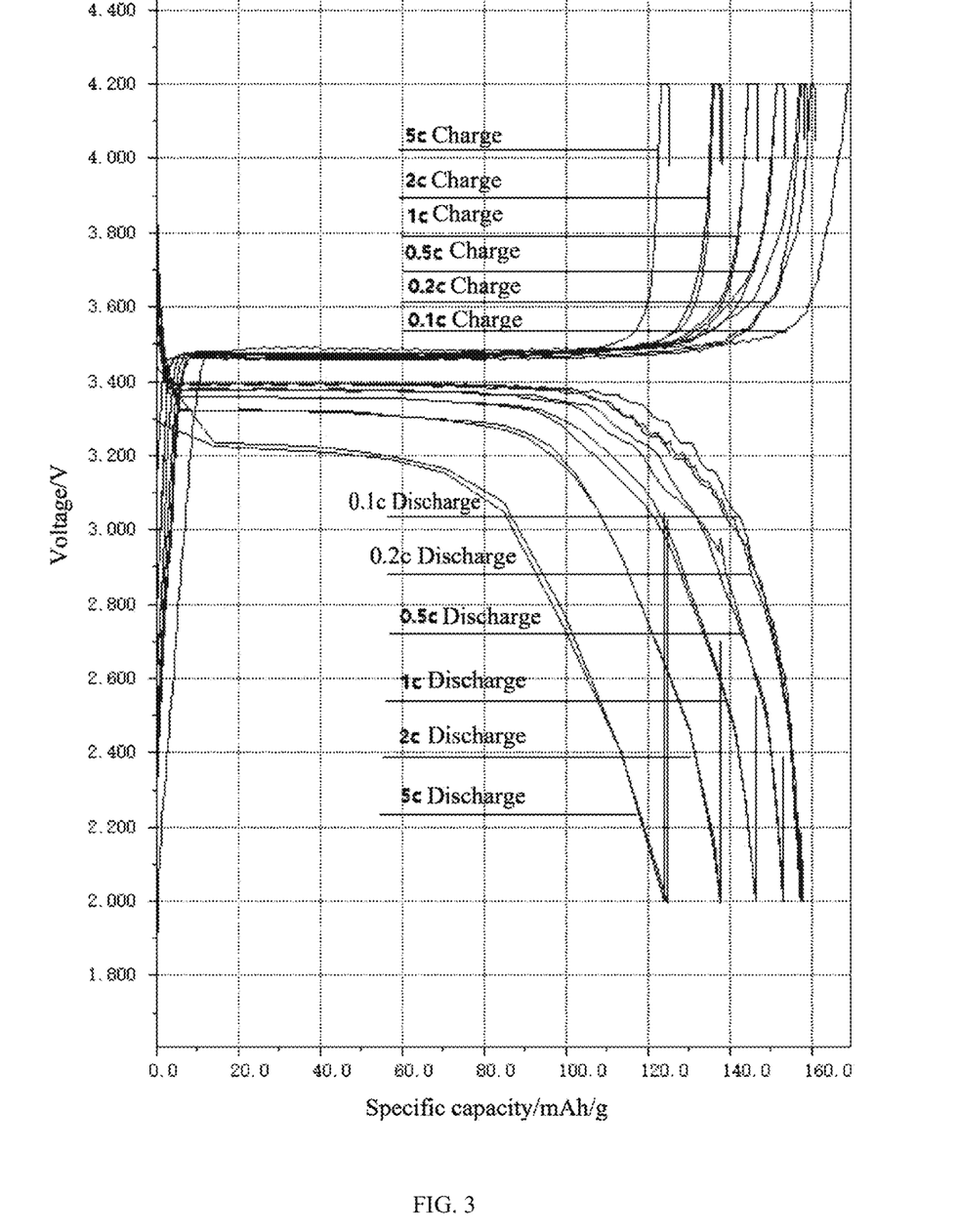
FIG. 3 are charge and discharge curves at different rates of the lithium iron phosphate of example 1.

Lithium iron phosphate powders prepared in examples 1 to 5 and comparative examples 2 to 3 were taken respectively and mixed with carbon black and polyvinylidene fluoride (PVDF) in a mass ratio of 80:10:10 until uniform; then the resulting mixture was coated onto an aluminum foil and dried to prepare an appropriate positive electrode test piece, which was assembled with lithium metal to form a 2032 button battery, and charge and discharge cycle tests were carried out by means of a charge and discharge machine (LAND CT2001A) in a charge and discharge range of 2.0 V to 4.2 V at charge and discharge rates of C/10, C/5, C/2, 1 C, 2 C and 5 C. The results were shown in FIG. 3 and Table 1.

TABLE 1

Specific discharge capacities at different discharge rates of examples 1 to 5 and comparative examples 2 to 3 (mAH/g)

| | Discharge rate | | | | | |
|---|---|---|---|---|---|---|
| | 0.1 C | 0.2 C | 0.5 C | 1 C | 2 C | 5 C |
| Example 1 | 157.8 | 157.4 | 153.1 | 146.3 | 137.7 | 123.1 |
| Example 2 | 157.5 | 157.0 | 152.2 | 145.7 | 136.0 | 122.2 |
| Example 3 | 158.1 | 157.9 | 154.2 | 146.8 | 138.3 | 124.2 |
| Example 4 | 157.3 | 157.0 | 152.8 | 145.9 | 137.5 | 123.0 |
| Example 5 | 157.2 | 156.8 | 152.1 | 145.8 | 137.2 | 122.9 |
| Comparative example 2 | 142.1 | 138.2 | 134.2 | 113 | 97.3 | 84.2 |
| Comparative example 3 | 156.4 | 155.5 | 150.1 | 140.3 | 130.2 | 108.8 |

TABLE 2

Solid contents of product slurries and spray drying dehydration of examples 1 to 5 and comparative examples 2 to 3

| | Example 1 | Example 2 | Example 3 | Example 4 | Example 5 | Comparative example 2 | Comparative example 3 |
|---|---|---|---|---|---|---|---|
| Solid content of finished product slurry/% | 50 | 53 | 60 | 50 | 50 | 17 | 35 |
| Dehydration amount required for 1 kg of precursor/kg | 1.0 | 0.88 | 0.66 | 1.0 | 1.0 | 4.88 | 1.86 |
| Energy consumption for dehydration required for 1 kg of precursor | Low | Low | Low | Low | Low | High | High |

As shown in Table 2, examples 1 to 5 can significantly reduce the dehydration amounts required for preparing the precursors, and thus significantly reduce the energy consumption required for dehydration, as compared to comparative examples 2 to 3. In comparative example 1, the preparation method based on the prior art only improved the solid content, and had the problem that the viscosity was too high to stir. In comparative examples 2 to 3, no organic acid was added to the reaction of product B, thus failing to realize the effect of the present disclosure.

Although the specific embodiments of the present disclosure have been described above, it will be understood by those of skill in the art that these are merely illustrative, and that various alterations or modifications can be made to these embodiments without departing from the principle and essence of the present disclosure. Therefore, the scope of protection of the present disclosure is defined by the appended claims.

What is claimed is:

1. A preparation method for a lithium iron phosphate precursor, wherein the preparation method comprises the following steps:
   S1. reacting a mixture of an iron source and a phosphoric acid solution, and grinding after the reaction is completed to obtain a product A, and
   reacting a mixture of an organic acid solution, a lithium source and a carbon source, and obtaining a product B after the reaction is completed, wherein the preparation order of the product A and the product B is not limited; the mass percentage concentration of phosphoric acid in the phosphoric acid solution is 20% to 85%; the mass percentage concentration of an organic acid in the organic acid solution is 55% to 72%; the organic acid in the organic acid solution is one of a carboxylic acid compound, ascorbic acid or a combination of carboxylic acid and ascorbic acid, the carboxylic acid compound is one or more of formic acid, acetic acid, oxalic acid, citric acid, tartaric acid and malic acid;
   S2. grinding a mixture of the product A and the product B to obtain a lithium iron phosphate precursor, the lithium iron phosphate precursor has a solid content of 50% or more; the lithium iron phosphate precursor has a particle size of 170 to 250 nm.

2. The preparation method for a lithium iron phosphate precursor according to claim 1, wherein the preparation method satisfies one or more of the following conditions:
   (1) the iron source is a compound containing an iron element and an oxygen element;
   (2) the iron source has a mesh number of 200 to 1000 mesh.

3. The preparation method for a lithium iron phosphate precursor according to claim 2, wherein the iron source is one or more of iron powder, ferric oxide, ferriferrous oxide and ferric nitrate;
   or, the iron source has a mesh number of 200 to 500 mesh.

4. The preparation method for a lithium iron phosphate precursor according to claim 2, wherein the iron source is one or more of iron powder, ferric oxide and ferriferrous oxide;
   or, the iron source has a mesh number of 250 mesh or 300 mesh.

5. The preparation method for a lithium iron phosphate precursor according to claim 3, wherein the iron powder has an iron content of 95 wt % or more;
   or, the iron powder is one or more of a primary reduced iron powder, a secondary reduced iron powder, a carbonyl reduced iron powder and an electrolytic iron powder;
   or, the ferric oxide has a purity of 95 wt % or more;
   or, the ferriferrous oxide has a purity of 95 wt % or more.

6. The preparation method for a lithium iron phosphate precursor according to claim 3, wherein the iron powder has an iron content of 99 wt % or more;
   or, the ferric oxide has a purity of 99 wt % or more;
   or, the ferriferrous oxide has a purity of 99 wt % or more.

7. The preparation method for a lithium iron phosphate precursor according to claim 3, wherein the iron powder has an iron content of 99.5 wt % or more;
   or, the ferric oxide has a purity of 99.5 wt % or more;
   or, the ferriferrous oxide has a purity of 99.5 wt % or more.

8. The preparation method for a lithium iron phosphate precursor according to claim 3, wherein the iron powder has an iron content of 99.7 wt % or more.

9. The preparation method for a lithium iron phosphate precursor according to claim 1, wherein the preparation method satisfies one or more of the following conditions:
   (1) the mass percentage concentration of phosphoric acid in the phosphoric acid solution is 49%, 59% or 62%;
   (2) the phosphoric acid in the phosphoric acid solution is a technical grade phosphoric acid, a food grade phosphoric acid, an electric grade phosphoric acid or an electronic grade phosphoric acid;
   (3) a reaction temperature for the mixture of an iron source and a phosphoric acid solution is 20 to 95° C.;
   (4) in the mixture of an iron source and a phosphoric acid solution, a molar ratio of the iron element to the phosphoric acid is (0.94 to 1.05):1.

10. The preparation method for a lithium iron phosphate precursor according to claim 1, wherein a reaction temperature for the mixture of an iron source and a phosphoric acid solution is 30 to 90° C.;
   or, in the mixture of an iron source and a phosphoric acid solution, a molar ratio of the iron element to the phosphoric acid is (0.96-1.0):1.

11. The preparation method for a lithium iron phosphate precursor according to claim 1, wherein a reaction temperature for the mixture of an iron source and a phosphoric acid solution is 35° C., 45° C. or 55° C.;
   or, in the mixture of an iron source and a phosphoric acid solution, a molar ratio of the iron element to the phosphoric acid is 0.98:1.

12. The preparation method for a lithium iron phosphate precursor according to claim 1, wherein the preparation method satisfies one or more of the following conditions:
   (1) the grinding is performed by means of a sand mill;
   (2) the product A has a viscosity of 8,000 to 20,000 cps;
   (3) the mass percentage concentration of an organic acid in the organic acid solution is 62%;
   (4) the organic acid is citric acid, or oxalic acid, or malic acid, or tartaric acid, or a combination of citric acid and oxalic acid, or a combination of malic acid and tartaric acid.

13. The preparation method for a lithium iron phosphate precursor according to claim 12, wherein the sand mill is a vertical sand mill, a horizontal sand mill, a basket sand mill or a double-cone rod sand mill;
   or, the grinding beads used in the sand mill have a particle size of 0.1 to 3.0 mm;
   or, the grinding beads used in the sand mill are zirconium oxide beads;
   or, the product A has a viscosity of 10,000 to 20,000 cps.

14. The preparation method for a lithium iron phosphate precursor according to claim 12, wherein the grinding beads used in the sand mill have a particle size of 0.3 mm or 0.4 mm;
   or, the product A has a viscosity off 15,000 cps.

15. The preparation method for a lithium iron phosphate precursor according to claim 1, wherein the preparation method satisfies one or more of the following conditions:
   (1) the lithium source is one or more of lithium hydroxide monohydrate, lithium carbonate, lithium dihydrogen phosphate, lithium phosphate and lithium acetate;
   (2) the molar ratio of lithium element in the lithium source to phosphoric acid in the phosphoric acid solution is 0.98 to 1.05;

(3) the carbon source comprises one or more of glucose, sucrose, starch, phenolic resin, cyclodextrin, polyethylene, polyethylene glycol and polyvinyl alcohol;

(4) the addition amount of the carbon source is 1% to 60% by mass of the iron source;

(5) a reaction temperature for the mixture of an organic acid, a lithium source and a carbon source is 20 to 95° C.;

(6) the lithium iron phosphate precursor has a particle size of 200 nm or 220 nm.

16. The preparation method for a lithium iron phosphate precursor according to claim 1, wherein the lithium source is lithium hydroxide monohydrate, or lithium acetate, or a combination of lithium hydroxide monohydrate and lithium acetate;

or, the molar ratio of lithium element in the lithium source to phosphoric acid in the phosphoric acid solution is 1.02, 1.03 or 1.04;

or, the carbon source is a mixture of polyvinyl alcohol, cyclodextrin and polyethylene glycol;

or, the addition amount of the carbon source is 5% to 50% by mass of the iron source;

or, reaction temperature for the mixture of an organic acid, a lithium source and a carbon source is 30 to 90° C.

17. The preparation method for a lithium iron phosphate precursor according to of claim 1, wherein the addition amount of the carbon source is 10% to 40% by mass of the iron source;

or, reaction temperature for the mixture of an organic acid, a lithium source and a carbon source is 35° C., 40° C. or 45° C.

18. The preparation method for a lithium iron phosphate precursor according to of claim 15, wherein the lithium carbonate is a technical grade lithium carbonate or a battery grade lithium carbonate.

19. A lithium iron phosphate precursor, wherein the lithium iron phosphate precursor is prepared by a preparation method for a lithium iron phosphate precursor according to claim 1.

20. A preparation method for lithium iron phosphate, wherein the preparation method comprises the following step: subjecting the lithium iron phosphate precursor according to claim 19 to spray drying, calcinating and crushing.

21. A lithium iron phosphate, wherein the lithium iron phosphate is prepared by a preparation method for lithium iron phosphate according to claim 20.

* * * * *